(12) United States Patent
Short et al.

(10) Patent No.: US 12,054,639 B2
(45) Date of Patent: Aug. 6, 2024

(54) MATERIALS THAT RESIST FOULING AND METHODS FOR IDENTIFYING SAME

(71) Applicant: Massachusetts Institute of Technology, Cambridge, MA (US)

(72) Inventors: Michael P. Short, Cambridge, MA (US); Max B. Carlson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/672,466

(22) Filed: Feb. 15, 2022

(65) Prior Publication Data
US 2022/0169865 A1  Jun. 2, 2022

Related U.S. Application Data

(62) Division of application No. 16/148,823, filed on Oct. 1, 2018, now Pat. No. 11,267,972.

(60) Provisional application No. 62/567,707, filed on Oct. 3, 2017.

(51) Int. Cl.
  *C09D 5/00* (2006.01)
  *C09D 1/00* (2006.01)
  *C09D 5/16* (2006.01)

(52) U.S. Cl.
  CPC ............... *C09D 5/00* (2013.01); *C09D 1/00* (2013.01); *C09D 5/16* (2013.01)

(58) Field of Classification Search
  None
  See application file for complete search history.

(56) References Cited

U.S. PATENT DOCUMENTS

2010/0150982 A1\* 6/2010 Mount ..................... C09D 1/00
  427/2.24
2018/0187008 A1\* 7/2018 Kurtoglu ................ C08G 18/61

OTHER PUBLICATIONS

Brault et al, "Dry Film Refractive Index as an Important Parameter for Ultra-Low Fouling Surface Coatings," Bio Macromolecules, pp. 589-593 (Year: 2012).\*

(Continued)

*Primary Examiner* — Colin W. Slifka
(74) *Attorney, Agent, or Firm* — Owens Law Firm, PC

(57) ABSTRACT

In general, the present invention is directed to materials that when in use resist fouling on their surfaces. Such materials may be used in the construction of various process equipment having surfaces exposed to a given fluid that contains a foulant or chemical substance that may deposit on, or adhere to, the surface and thereafter continue to grow on the surface resulting in deteriorated performance of the equipment and process. The materials are specifically selected using a method that takes into account the dielectric spectra of the fluid to which the surface is exposed and the surface itself. It has been unexpectedly found that if the dielectric spectra of the surface and the fluid are matched to within relative agreement, there should be no adhesion of the foulant on the surface. In some embodiments, the dielectric spectra to be matched include the intrinsic indexes of refraction.

19 Claims, 4 Drawing Sheets

(56) References Cited

OTHER PUBLICATIONS

Reddy et al, "A study on Refractive index of plasma of blood of patients suffering from Tuberculosis," International Journal of Innovative Technology and Creative Engineering, vol. 2, No. 8, pp. 23-25 (Year: 2012).*

Product Brochure for the Alpha-SE Ellipsometer, sold by J.A. Woollam Found at https://www.jawoollam.com/download/pdfs/alpha-se-brochure.pdf accessed Sep. 5, 2020 (Year: 2020).*

* cited by examiner

Typical VEELS spectrum

MATERIALS THAT RESIST FOULING AND METHODS FOR IDENTIFYING SAME

CROSS-REFERENCE TO RELATED APPLICATIONS

This application is a divisional of prior application Ser. No. 16/148,823 filed Oct. 1, 2018, now U.S. Pat. No. 11,267,972, which claims the benefit of provisional Application No. 62/567,707, filed Oct. 3, 2017. The entirety of each of the foregoing applications is incorporated by reference herein.

BACKGROUND OF THE INVENTION

Field of the Invention

The present invention is directed to methods for the reduction or elimination of fouling on material or component surfaces. More specifically, the present invention is directed to methods for the identification of materials of construction for such surfaces, either as coatings or as the materials themselves, having a dielectric spectrum that matches or is similar to that of the fluid to which the surface is exposed.

Description of Related Art

Fouling of a surface, or the undesired deposition of materials onto a given surface, is a problem that affects fields ranging from energy to transportation to medicine. Energy production and distribution systems are particularly susceptible to the detriments associated with fouling, as they rely on the continued cleanliness of their functional surfaces, for example, to transfer heat, catalyze chemical reactions, and resist corrosion. Particulate fouling, or the adhesion of particulates to surfaces, is present to some extent in almost all geothermal plants, oil refineries, nuclear plants, chemical processing, and marine systems. Fouling of internal pipe surfaces increases pressure drops across components, reduces heat transfer efficiency, and may block coolant channels entirely, resulting in loss of process efficiency and possibly necessitating the replacement of components. Considering the costs of increased energy consumption, reduced throughput, and maintenance associated with fouling gives an estimated economic impact of billions of dollars, estimated to cost the U.S. $15 billion in 2013 alone.

Teflon or other slippery polymers may be used in some situations to reduce or minimize fouling, as they resist the buildup of almost all potential foulants. However, many energy systems where fouling occurs operate in conditions too harsh for Teflon or any organic material to remain stable. Therefore, a more general solution to the problem of fouling is needed. Specifically, a solution to fouling in harsh environments, such as those in various energy systems, is needed.

BRIEF SUMMARY OF THE INVENTION

Initial fouling or initial deposition of a foulant on a surface can be caused by van der Waals forces, often the main force determining the adhesion of foulants in energy systems. Therefore, preventing such forces should reduce or eliminate any initial deposition of the foulant caused by van der Waals forces, which, in turn, would result in reduced fouling or in the elimination of fouling. The theory of van der Waals forces shows that by obtaining or engineering a close match between the dielectric spectra of either the surface being fouled or of the foulant with that of the fluid would lead to the significant reduction or elimination of van der Waals forces. Of course, for a given system, the potential foulant and the fluid are essentially fixed or determined by the system and may not be capable of variation. In other words, the compositions of the foulant and the fluid may not be changed simply to prevent fouling without sacrificing the main objective of the system in the first place. Therefore, by selecting a material of construction for the surface exposed to potential fouling, either as a coating or as the material itself, with a dielectric spectrum that matches or approximates that of the fluid to which it is exposed should reduce or eliminate van der Waal forces such that deposition of the foulant is prevented.

In one embodiment, the present invention provides a method for selecting a material of construction for a surface exposed to a fluid having a foulant, comprising selecting a material of construction for a surface exposed, during use, to a fluid comprising a foulant, wherein the material of construction, either a coating on the material or the material itself, whichever is exposed to the fluid, has an index of refraction within the full refractive index spectrum that matches or approximates an index of refraction within the full refractive index spectrum of the fluid.

In one embodiment, the present invention provides a method for selecting a material of construction for a surface exposed to a fluid having a foulant, comprising selecting a material of construction for a surface exposed, during use, to a fluid comprising a foulant, wherein the material of construction has an index of refraction within the full refractive index spectrum that is within 20% of an index of refraction within the full refractive index spectrum of the fluid. It should be appreciated that in one embodiment, at least one value within the complete spectrum needs to match within 20%.

In another embodiment, the present invention provides a method for selecting a material of construction for a surface exposed to a fluid having a foulant, comprising selecting a coating for a surface exposed, during use, to a fluid comprising a foulant, wherein the coating has an index of refraction within the full refractive index spectrum that is within 20% of an index of refraction within the full refractive index spectrum of the fluid.

In another embodiment, the present invention provides a material of construction, comprising a body having a surface that is exposed to a fluid comprising a foulant during use; and an index of refraction within the full refractive index spectrum that is within 20% of an index of refraction within the full refractive index spectrum of the fluid.

In another embodiment, the present invention provides a coating for a surface, comprising a coating for a surface that is exposed to a fluid comprising a foulant during use; and an index of refraction within the full refractive index spectrum that is within 20% of an index of refraction within the full refractive index spectrum of the fluid. In one embodiment, the coating is disposed on the surface of the material.

DETAILED DESCRIPTION OF THE INVENTION

Various embodiments of the invention are described below in conjunction with the Figures. However, this description should not be viewed as limiting the scope of the present invention or as setting forth the only embodiments of the invention. Rather, it should be considered as exemplary of various embodiments of the invention since invention encompasses other embodiments not specifically recited in this description such as alternatives, modifications, and equivalents within the spirit and scope of the invention and as defined by the claims. Accordingly, it should be appreciated that references to "the invention" or "the present invention" should not be construed as meaning that the invention is directed to only one embodiment or that every embodiment must contain a given feature described in connection with another embodiment or described in connection with the use of such phrases.

In general, the present invention is directed to materials that in use resist fouling on their surfaces. Such materials may be used in the construction of various process equipment having surfaces exposed to a given fluid that contains a foulant or chemical substance that may deposit on, or adhere to, the surface and thereafter continue to grow on the surface resulting in deteriorated performance of the equipment and/or the process. The materials are specifically selected using a method that takes into account the dielectric/refractive spectra (which are directly related) of the fluid to which the surface is exposed. It has been unexpectedly found that if the dielectric spectra of the surface and the fluid are matched, or are close, there should be no adhesion of the foulant on the surface. In some embodiments, the dielectric spectra to be matched include the intrinsic index of refraction.

Figure 1:
FIG. 1 illustrates the fouling process beginning with a clean surface, then attachment of a monolayer of particles, followed by continued scale growth.
Figure 1:
Figure 1:

More specifically, and without being limited by theory, the initial deposition or adherence of a foulant, or foulant particles, on a surface is believed to be due to van der Waals forces between the surface and the foulant. Based upon the Lifshitz theory of van der Waals forces, it has been determined that if the dielectric spectrum of either the foulant or the surface material is the same as that of the fluid carrying the foulant and to which the surface is exposed, then there should be no van der Waals forces. By eliminating such forces, there should be no adherence of the foulant on the surface or no formation of an initial monolayer of foulant particles on the surface and, therefore, no continued growth of any foulant on the surface. FIG. 1 illustrates the fouling process beginning with a clean surface, then attachment of a partial or complete monolayer of particles, followed by continued scale growth. The present invention focuses on reducing or eliminating the initial deposition of the monolayer of particles.

It should be appreciated that matching the dielectric spectrum of the foulant to the fluid will produce the same result; however, in most practical applications, neither the foulant nor the fluid can be "selected" since these are fixed by the process being used. Therefore, the only practical method would be to select the appropriate materials of construction for the surface exposed to the fluid. It should be appreciated that the materials of construction includes the material used for the surface exposed to the fluid and in some embodiments includes a coating on the underlying material used. Therefore, it should be appreciated that if a given surface is coated, the coating can be similarly selected based upon matching its dielectric spectrum to that of the fluid. It should also be appreciated that "matching" the dielectric spectra does not necessarily mean that the dielectric spectra of the surface and fluid must match exactly. In some embodiments, the "match" may be within ±0-20% of each other. In some embodiments, the "match" may be within ±5%, ±10%, or ±20%, and these "matches" may be wavelength- or frequency-dependent, tuned to the wavelength(s) or frequency(ies) that determine van der Waals forces most significantly.

Without being bound by theory, the following presents an analysis of the discovery that by matching dielectric spectra, a reduction or elimination of van der Waals (vdW) forces would occur. The vdW force between two materials a and b in a fluid f is of the inverse square form with separation r, similar to Coulomb interactions:

$$F_{afb}^{vdW} = -\frac{A_{afb}^{Ham}}{12\pi r^2} \quad (1)$$

The force is directly proportional to $A_{afb}^{Ham}$, known as the Hamaker constant. This constant defines the magnitude of the force and whether the force is attractive or repulsive (the latter being uncommon). Since the vdW force arises from coupled electron motion creating induced dipoles, the Hamaker constant is calculated by taking into account a material's response to oscillating electric fields—in other words, optical properties like the index of refraction or reflectivity. It is most direct to calculate the Hamaker constant from the material's imaginary-frequency dielectric response $\varepsilon(\zeta)$, but this difficult-to-interpret quantity is directly related to more conventional measurements such as reflectivity or ellipsometry. It may also be obtained to high accuracy by more advanced measurements such as Valence Electron Energy Loss Spectroscopy (VEELS). The formula for a full-spectrum relativistic Hamaker constant (the formula with the fewest assumptions and limitations, but also the most complex) is:

$$A_{afb}^{Ham} = \frac{3}{2} k_B T \Sigma_{n=0}^{\infty} R_n(r) \Delta_{af}(\zeta_n) \Delta_{bf}(\zeta_n) \quad (2)$$

where $k_B$ is Boltzmann's constant in $$\frac{eV}{K},$$

T is the temperature in Kelvin, $R_n(r)$ is an optical retardation factor (which accounts for differing path lengths for differently polarized photon propagation), and $\Delta_{jk}$ is the difference in dielectric response to a virtual photon at an imaginary (complex) frequency $\zeta_n$–$iv_n$, where n is a discrete energy level from 0 to ∞. The $\Delta_{jk}$ variables can be thought of as contributions to adhesion energy based on differing polarizability at different frequencies or differences in electron vibrations at different frequencies. Each of these can be expressed as follows:

$$\Delta_{jk}(\zeta) = \frac{\varepsilon_j(\zeta) - \varepsilon_k(\zeta)}{\varepsilon_j(\zeta) + \varepsilon_k(\zeta)} \tag{3}$$

here $\varepsilon(\zeta)$ is the dielectric response function of material j at imaginary frequency $\zeta$. Finally, each of these can be expressed in terms of its real, measurable components by applying the Kramers-Kronig (KK) relation, connecting the real and imaginary components of any causal function:

$$\varepsilon(\zeta) = 1 + \frac{2}{\pi} \int_0^\infty \frac{\omega \varepsilon(\omega)}{\omega^2 + \zeta^2} d\omega \tag{4}$$

where $\omega$ is a real frequency. In this way, we can transform tabulated optical data into a Hamaker constant, which can also be measured using atomic force microscope force spectroscopy (AFM-FS) via the adhesion force. Using this knowledge, we have one deterministic angle of attack: the difference term in Equation 3. If the two imaginary dielectric spectra of any of the materials a and b with the fluid f are equal, then theoretically no adhesion should take place. Because the real and imaginary components of the dielectric spectra are linked by Equation 4, then finding a match between fluid and either material's dielectric spectrum should lead to little/no adhesion via vdW forces, enough to significantly reduce or eliminate fouling.

Methods to determine the full dielectric spectra for existing, untabulated materials are required. These spectra may be determined directly using a capacitance bridge setup or an ellipsometric measurement, and indirectly by reflectance spectroscopy and VEELS. Additionally the spectra may be obtained by ab initio band structure calculations, such as Density Functional Theory (DFT) simulations. In order to accurately calculate the Hamaker coefficient it is important to have experimental dielectric response data over a wide frequency range, from static to IR (important for water) to UV. VEELS enables experimental testing of a very wide range of frequencies (0-100 eV is typical). However, optical reflectance measurements remain the most straightforward to carry out experimentally.

Figure 2:
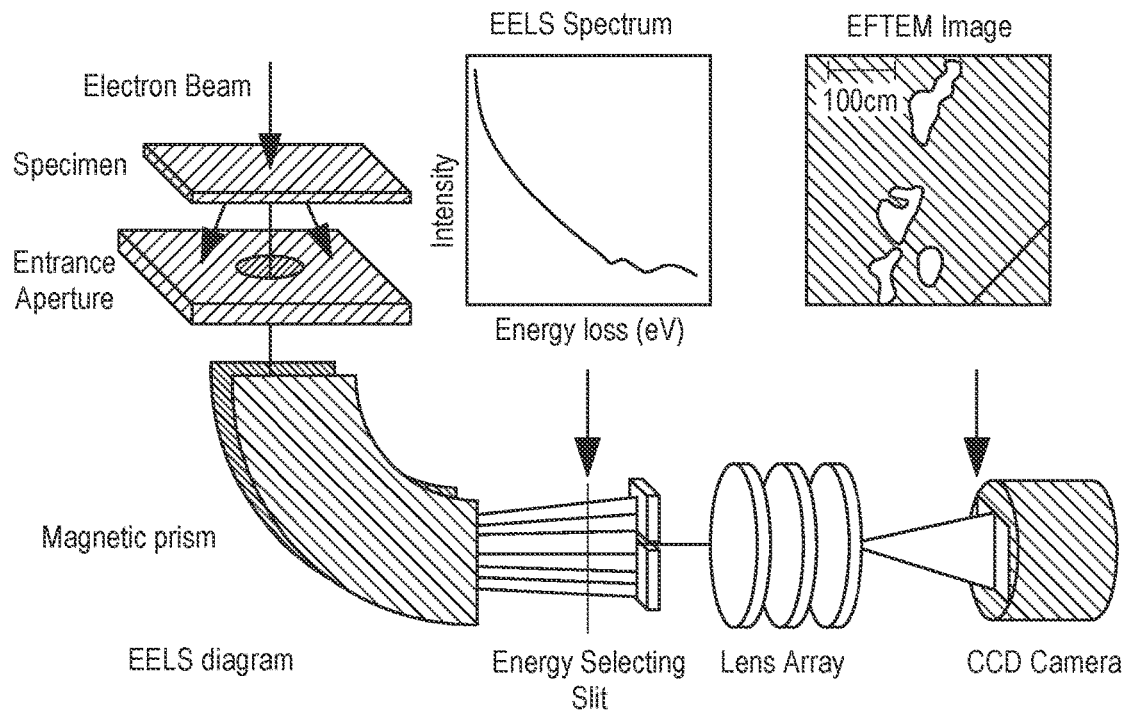
FIG. 2 illustrates a diagram of EELS, along with typical VEELS calculated and measured spectra.
Figure 2:
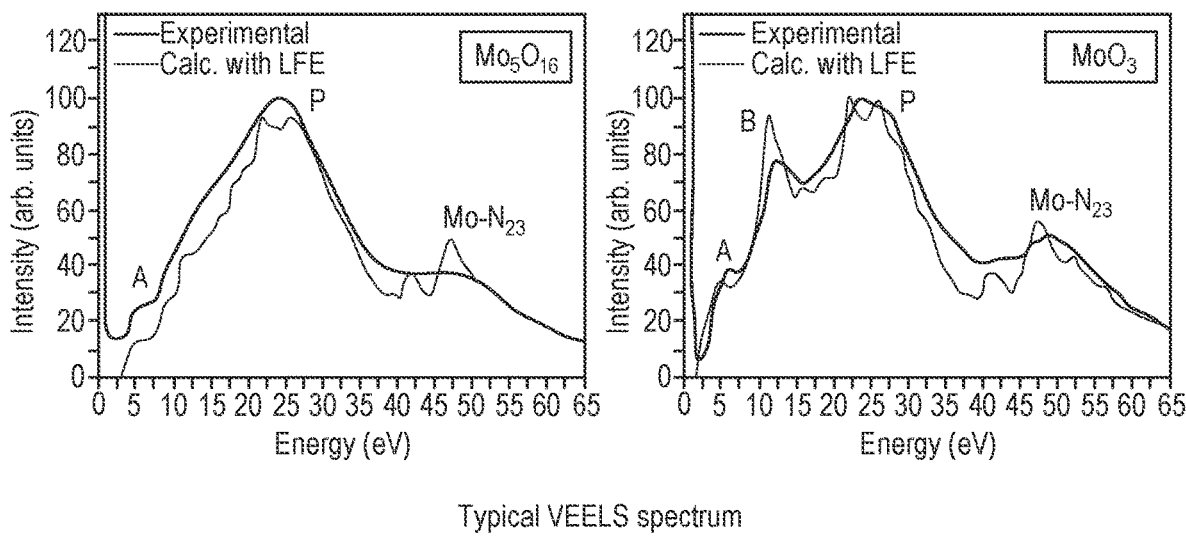

FIG. 2 illustrates a diagram of EELS, along with typical VEELS calculated and measured spectra. VEELS is an electron energy-loss technique, which measures the amount of energy lost by electrons in single scattering collisions as they traverse through a very thin specimen. The specimen thickness is chosen to be far lower than the electron range in the medium, which ensures almost all single scattering events of the non-transmitted portion of the electron beam. This provides an additional measure of surety in the measured data, as methods such as DFT directly predict the energy levels of valence electrons, which is what are probed using VEELS. Here, the number of electrons losing a certain amount of energy is measured and tabulated as the arbitrary units of intensity. This, normalized to known, absolute values at certain wavelengths (perhaps obtained by reflectance spectroscopy) yields the dielectric spectrum of the material.

In all practical experiments, limitations exist on the upper and lower frequencies that can be tested; however the KK transform requires measurements over an infinite frequency range (as seen in the limits of the integral in Equation 4). Therefore, it is conventional to supplement experimental data with approximations for frequencies lower and higher than measured ones. A typical choice for this approximation is a power law $\varepsilon(\omega) \propto \omega^{-\beta}$ with different values of the exponent $\beta$ for the high and low sides. This power law approximation is also used to interpolate to frequencies between measured data points. Another choice of approximations is a constant value $\varepsilon(\omega|\omega<\omega_{min}) \approx \varepsilon(\omega_{min})$ for the low frequency range corresponding to the minimum measured frequency, and the free electron result $\varepsilon(\omega|\omega>\omega_{max})=1-\omega_e^2/\omega^2$ for the high frequency range (where $\omega_e$ is the plasma frequency of a free electron gas).

Methods for measuring reflectance on materials are well established, as are the transforms to obtain dielectric spectra. Having determined the frequency-dependent reflectance, the KK transform is applied to obtain a frequency-dependent phase measurement. The reflectance and phase are combined in a linear system of equations to obtain the frequency-dependent real and imaginary dielectric responses, $\varepsilon_r(\omega)$, which is then substituted directly in Equation 4 to yield the dielectric response to imaginary frequency $\varepsilon_i(\zeta)$. The force due to van der Waals interactions is then determined by following the Equations 3, 2, and 1.

It should be appreciated that the Tabor-Winterton Approximation (TWA), which is valid for materials with similar absorption frequencies $\omega$ and low refractive indexes n in the visible spectrum, may be used for an initial candidate material search. The TWA is:

$$A_{afb}^{Ham} \approx A_{afb}^{TWA} = \frac{3}{4}kT\left(\frac{\varepsilon_a - \varepsilon_f}{\varepsilon_a + \varepsilon_f}\right)\left(\frac{\varepsilon_b - \varepsilon_f}{\varepsilon_b + \varepsilon_f}\right) + \frac{3\pi h v_c}{4\sqrt{2}} \frac{(n_a^2 - n_f^2)(n_b^2 - n_f^2)}{\sqrt{(n_a^2 + n_f^2)(n_b^2 + n_f^2)}\left(\sqrt{(n_a^2 + n_f^2)} + \sqrt{(n_b^2 + n_f^2)}\right)} \tag{5}$$

In this way, the visible spectrum indices of refraction, n, along with zero-frequency dielectric constant (polarizability) can be used to take first guesses at which materials should be slick, or fouling-resistant. The goal of finding a material that reduces adhesion is thus methodically approached as finding a material with specific optical properties suited for the system, since the properties of the fluid and of the fouling particles are already given. The relatively tedious experimental measurements may be significantly expanded by computational analysis of the literature containing measured spectra of materials (applying equations 2 and 3), as well as by modeling of new materials where spectra are calculated based on energy bands from DFT simulations. Due to the vast number of permutations of sample materials to simulate and a complex dependence of adhesive force on material properties, a genetic algorithm would be appropriate to explore this computational design space.

From the TWA, one way to minimize vdW interaction is to minimize the difference terms in the numerator of Equation 5. Substituting realistic values for the operating conditions, the second term of Equation 5 dominates over the first term. Therefore, the criterion that the initial candidate fouling resistant materials should have an index of refraction $n_a$ close to that of the fluid and neglecting the first term of Equation 5 for materials whose dielectric properties are not yet known are justified.

Figure 3:
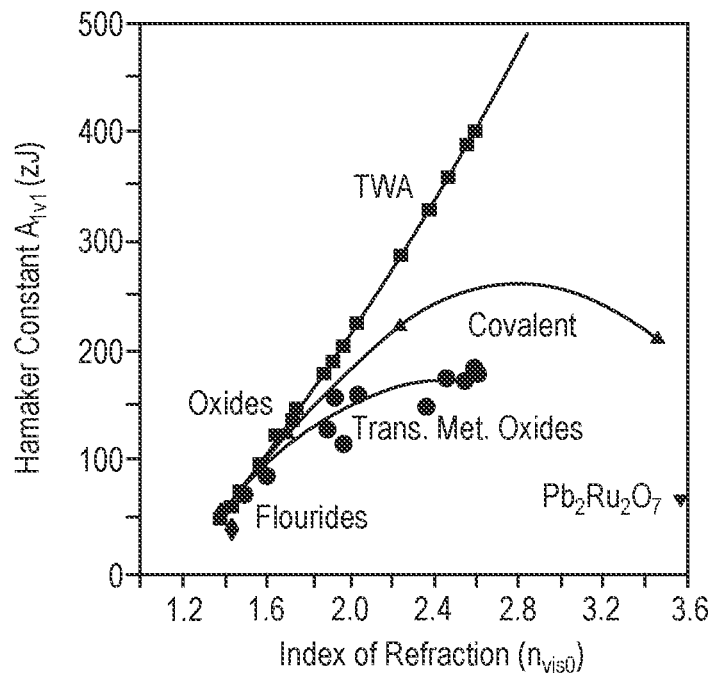
FIG. 3 shows the Hamaker constants of various materials using full-spectral and Tabor-Winterton calculations.

In one embodiment, one system of interest includes water-insoluble fluorides, which tend to be quite hard, earth-abundant, and insoluble in water. FIG. 3 shows the Hamaker constants of various materials using full-spectral and Tabor-Winterton calculations. As shown, many of the fluorides possess both low Hamaker constants and indices of refraction.

In one embodiment, with a focus on geothermal power plants, which use high temperature water as the fluid and suffer from Sift particulate fouling, tabulated data can be used to identify minerals that are water insoluble, relatively hard (to avoid erosion by $SiO_2$), and have low refractive indexes, the TWA can be applied to calculate expected vdW forces in water at room temperature. Table 1 summarizes the materials so identified thus far.

TABLE 1

Candidates for slick surface coatings and indices of refraction compared to those of water and typical passive oxide scales. (Parentheses indicate that dielectric constant data was not available for the approximation.)

| Material Type | Name | Formula | Mohs Hardness | Dielec. Const. $\varepsilon$ | Refract. Index h | $A_{afb}^{TWA}$ (zJ) |
|---|---|---|---|---|---|---|
| Foulant (b) | Silica | $SiO_2$ | 6.5-7.0 | 3.8 | 1.448 | — |
| Fluid (f) | Water (25 C.) | $H_2O$ | — | 80 | 1.333 | — |
| Natural oxide surfaces (a) | Magnetite | $Fe_3O_4$ | 5.0-6.5 | 20 | 2.42 | 1695 |
| | Chromia | $Cr_2O_3$ | 8.0-8.0 | 13.3 | 2.551 | 1980 |
| Proposed anti-fouling materials (a) | Calcite | $CaCO_3$ | 4 | 8.67 | 1.66 | 448 |
| | Microcline/Albite | $KAlSi_3O_8$ | 6.0-6.5 | ??? | 1.52 | (288) |
| | Olivine | $(Mg, Fe)_2SiO_4$ | 6.5-7.0 | ??? | 1.65 | (435) |
| | Pyrite | $FeS_2$ | 6.0-7.0 | ??? | 1.75 | (560) |
| | Fluorite | $CaF_2$ | 4 | ??? | 1.427 | 195 |
| | Cylolite | $Na_3AlF_6$ | 2.5-3.0 | ??? | 1.34 | (113) |
| | Olivine | $(Mg, Fe)_2SiO_4$ | 6.5-7.0 | ??? | 1.65 | (435) |
| | Muscovite | $KAl_2(AlSi_3O_{10})(F, OH)_2$ | 5.4-7.0 | 2.25 | 1.60 | 378 |

With reference to Table 1, note how each of them have visible indices of refraction very close to that of water, compared to the passive oxide layers that normally form on carbon steel ($Fe_3O_4$) and stainless steels or nickel-based superalloys ($Cr_2O_3$). As can be seen in Table 1, quite a number of materials are sufficiently close to water's index of refraction are predicted to pose a significant improvement over the passive oxides, which naturally grow on structural materials in geofluid or in a nuclear reactor, as examples.

Figure 4:
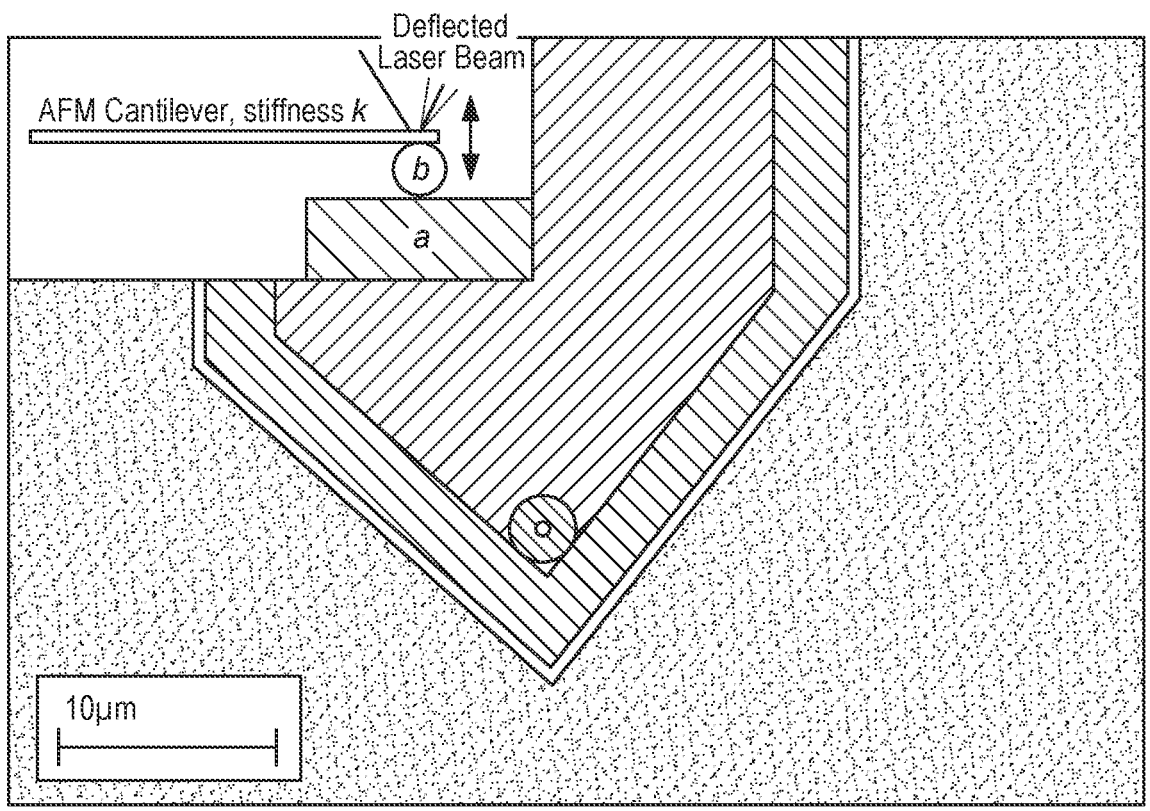
FIG. 4 illustrates one example of a cantilever used to measure the force of adhesion using AFM-FS.

FIG. 4 illustrates one example of a cantilever used to measure the force of adhesion using AFM-FS. Confirmation of the adhesion model comes from directly measuring the force of adhesion using AFM-FS. In this technique, a particle of the foulant/scale material, in this case $SiO_2$, is affixed to the end of a thin SiN cantilever. This cantilever is brought into contact with the surface to be measured, and a laser is bounced off the back of the cantilever, as shown in FIG. 4. The deflection of this laser is proportional to the bending of this cantilever, yielding the force required to bend the cantilever (following calibration of its spring constant k). Then, the cantilever is pulled up from the surface, and the force required to dislodge the particle is measured using the same technique. It should be appreciated that that contamination from moisture in the air, ions in the water, and ambient hydrocarbons must be taken into account and subtracted in order to acquire accurate AFM-FS data.

Figure 5:
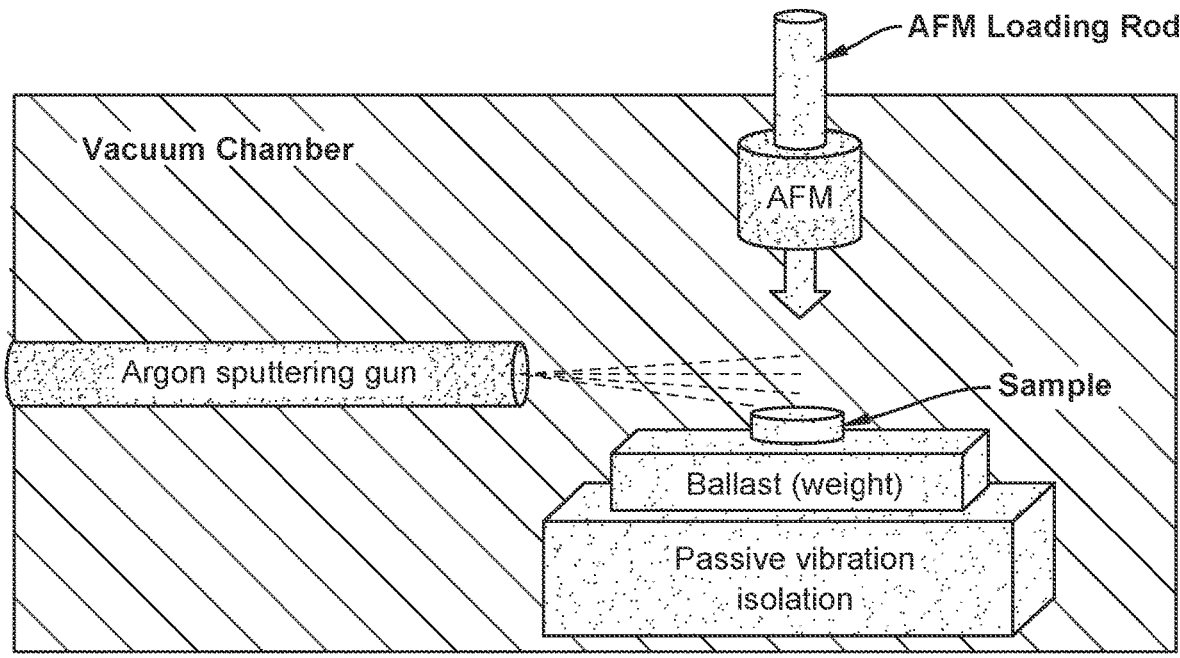
FIG. 5 illustrates a vacuum-inert AFM chamber.

In one embodiment, a vacuum-inert AFM chamber may be used. FIG. 5 illustrates a vacuum-inert AFM chamber. As shown, the vacuum chamber allows for pumping the entire system down to $10^{-3}$ Torr using a turbomolecular pump, while a differentially pumped argon ion sputtering gun will be used to sputter-clean the surface of the material to remove oxides and organic contaminants. Without exposure to air, AFM-FS can be performed on the fresh surface in either vacuum or dry inert gas atmosphere.

While the present invention provides a method for reducing or eliminating fouling on a material or surface through the use of optical properties of a given material and, specifically, using the Hamaker constant as a numerical measure of fouling propensity, an evolutionary algorithm approach such as USPEX, which was optimized to explore the multidimensional space of possible crystal structures and find the most energetically favorable ones, may be used to calculate the Hamaker constant of crystal structures.

Density Functional Theory (DFT) packages, such as VASP (Vienna Ab-initio Simulation Package), can be sued to find frequency-dependent dielectric response as supported by earlier works. Then, a script solves the full-spectrum sum (Equation 2) resulting in a calculated Hamaker constant. The DFT calculation also provides a measure of the energy of the crystal structure, which is an indication of whether the structure is realistic and stable at the operating conditions.

Figure 6:
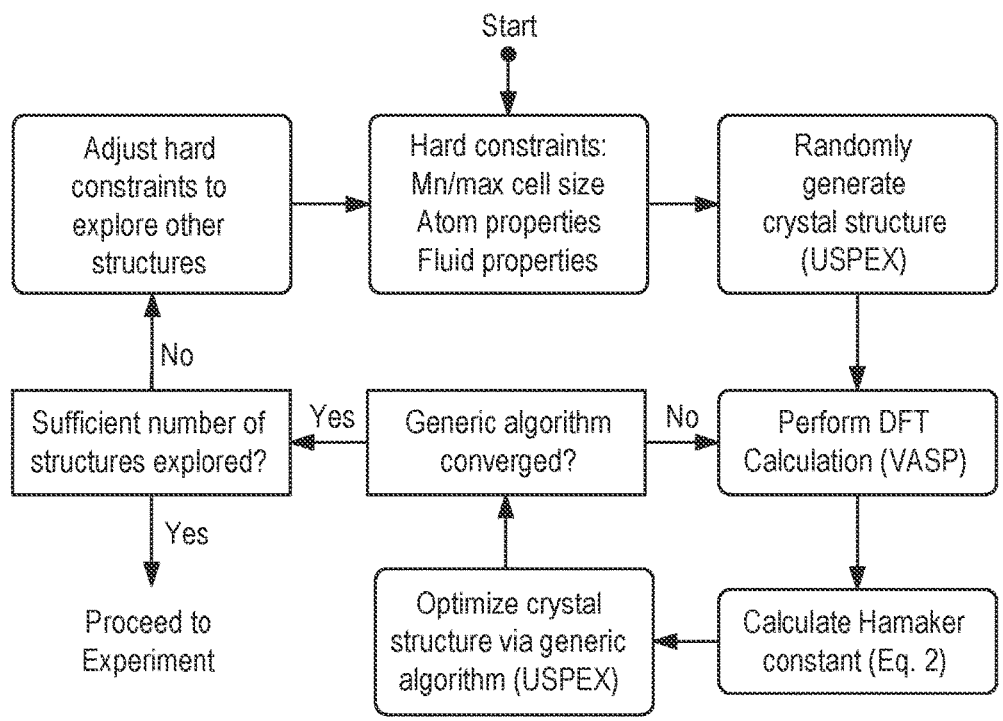
FIG. 6 schematically shows the use of the USPEX algorithm.

FIG. 6 schematically shows the use of the USPEX algorithm. In the USPEX algorithm, crystal structures are optimized in an evolutionary fashion. The algorithm begins by forming random structures that satisfy the initial "hard" constraints such as the number and type of atoms. These structures are then evaluated to obtain a fitness value for each, which determines whether the structure survives in subsequent generations. In standard usage of USPEX, this fitness value is the overall energy of the structure, which results in the most chemically stable (lowest energy) crystal. For the present invention, the fitness value is instead the Hamaker constant, favoring the structures with lowest adhesion forces. In this case the local energy minimization, which is still required to find realistic materials, is implemented as a relaxation of the structure in the DFT simulation. The surviving structures are then modified by three operators: heredity, mutation, and permutation. Some of the resulting structures will have more favorable fitness values, and the process is repeated again until a satisfactory number of high-performing structures is found.

Based on the foregoing, it should be appreciated that that many materials may be selected to provide a "slick" surface to which a foulant or foulant particles will not attach, thus preventing the formation of an initial monolayer that, in turn, precludes continued growth of the foulant or scale. It should further be appreciated that in most cases, the identity or chemical composition of the foulant is not important to the determination of which material of construction or coating to use for a given fluid to which the material or its surface is exposed. In other words, the selection of the material or material of construction or the coating is universal to each pair of material/coating and working fluid, agnostic of the multitude of potentially fouling materials in a given system. Moreover, because all working fluids in energy systems have visible indices of refraction ranging from 1.2-1.7, the TWA is a valid and accurate estimate of the total vdW force between foulants and material surfaces immersed in a non-vacuum working fluid. Further, because the numerator in the TWA (Equation 5) contains multiples of differences (the $(n_a^2-n_f^2)(n_b^2-n_f^2)$ term), only a near-match between either the working surface (material a) and the fluid (f) or the fluid and the foulant(s) is required. Because it is easier to control the working surface than to control the foulant(s), only a near match between the working surface and the fluid is required by simply matching the intrinsic index of refraction in the visible or the UV spectrum.

In some embodiments, the material selected matches the visible index of refraction in some portion of the complete optical spectrum of the fluid to which the surface or material is exposed to within ±20%. In some embodiments, the fluid may be a gas or a liquid and may have a visible index of refraction ranging from 1.00 to 1.76. In some embodiments, the material and may have a visible index of refraction ranging from 1.00 to 1.76 or 1.06 to 1.60. In some embodiments, the material may be solid, bulk material or a coating applied to another material such that the coating modifies the surface chemistry of the underlying material. In some embodiments, the material may be more generally a modification of the surface of the material through a process such as oxidation, fluoridation, surface nitriding, carbon infiltration, etc. In some embodiments, the material may be a crystalline material specifically chosen or designed to match the visible index of refraction of a surrounding fluid in some portion of the complete optical spectrum to within a relative agreement of ±20%. In some embodiments, the fluid may be water and may not include any foulant. In some embodiments, the fluid may be water and include more than one foulant. In some embodiments, the fluid may be water and the material may have an intrinsic, visible index of refraction ranging from 1.06 to 1.60. In some embodiments, the fluid may be water and the material may contain fluorine. In some embodiments, the fluid may be water and the material may contain a fluorine-bearing crystalline solid. In some embodiments, the fluid may be water and the material may contain fluorite ($CaF_2$), cryolite ($Na_3AlF_6$), albite or microcline ($KAlSi_3O_8$). In some embodiments, the material may be an amorphous material specifically chosen or designed to match the visible index of refraction of a surrounding fluid in some portion of the complete optical spectrum to within a relative agreement of ±20%. Although the entire optical spectrum (including the visible and non-visible ranges) may be material, in some embodiments, a match is determined within the range of 400-800 nm in the visible spectrum.

It should be appreciated that in some embodiments, the match between the index of refraction of the material and the surrounding fluid may be a match of the ultraviolet (UV) index of refraction as opposed to the visible index of refraction, or the spectral part of the UV range. Although the entire UV spectrum may be material, in some embodiments, a match is determined within the range of 10-400 nm in the UV spectrum.

In some embodiments, the material may be subjected to radiation, such as in a nuclear power plants. In such cases, crud is a form of fouling that degrades the nuclear fuel cladding. Therefore, a material must be selected that provides radiation resistance to retain its properties during use. The fluorine-based minerals described above not only resist radiation damage, but the atomic defects created by irradiation actually enhance their wettability over time and improving their heat transfer properties without sacrificing their fouling resistance. In some embodiments, ZrN and TiC are able to resist crud formation in a PWR environment. In some embodiments, TiN also is able to resist crud formation in a PWR environment.

It should be appreciated that the selection of certain materials for use in constructing surfaces exposed to a fluid that carries a foulant has wide applicability. For example, fouling costs the United States alone $15 billion in lost revenue in 2013. Every major, energy-intensive heat transfer, energy production, and chemical processing system that contains impurities undergoes fouling, and every one of these systems constitutes a potential revenue stream. For example, the present invention may be used to reduce the buildup of crud on nuclear fuel, the buildup of sludge in secondary heat transfer cycle of nuclear power plants, the buildup of silica on geothermal deep boreholes, the buildup of iron and steel-based corrosion products, as well as "black powder," in the heat exchangers in oil refineries, and the buildup of hard water deposits, which occurs virtually everywhere, including commercial and residential water plumbing systems.

What is claimed is:

1. A coating for a surface of an object to reduce adhesion of a foulant in a fluid in contact with the object, comprising:
   an object having a surface and a coating on said surface; and
   a fluid comprising a foulant, wherein said fluid is in contact with said coating;
   wherein said coating has an index of refraction within 10% of an index of refraction of said fluid in some portion of the complete optical spectrum and wherein said coating reduces an amount of adhesion of the foulant to said surface of the object compared to an amount of adhesion of the foulant to said surface of said object without said coating.

2. The coating of claim 1, wherein said coating reduces an initial deposition of a monolayer of particles of the foulant on said coating compared to an initial deposition of a monolayer of particles of the foulant on said surface of said object without said coating.

3. The coating of claim 1, wherein the index of refraction of said coating is within 5% of the index of refraction of said fluid.

4. The coating of claim 1, wherein the portion of the complete optical spectrum comprises 400-800 nm in a visible spectrum.

5. The coating of claim 1, wherein the portion of the complete optical spectrum comprises 10-400 nm in a UV spectrum.

6. The coating of claim 1, wherein said coating comprises a chemical selected from the group consisting of calcite, microcline or albite, olivine, pyrite, fluorite, cryolite, and muscovite.

7. The coating of claim 1, wherein the index of refraction of said fluid has a range of 1.00 to 1.76 and the index of refraction of said surface has a range of 1.00 to 1.76.

8. The coating of claim 1, wherein said coating is disposed on said surface of said object.

9. The coating of claim 8, wherein said coating reduces an initial deposition of a monolayer of particles of the foulant on said coating compared to an initial deposition of a monolayer of particles of the foulant on said surface of said object without said coating.

10. The coating of claim 8, wherein said fluid comprises water, the foulant comprises silicon dioxide, and said coating comprises a chemical selected from the group consisting of calcite, microcline or albite, olivine, pyrite, fluorite, cryolite, and muscovite.

11. The coating of claim 8, wherein said object comprises an object used in a geothermal power plant.

12. An object in contact with a fluid having a coating to reduce adhesion of a foulant in the fluid on the surface of the object, comprising:
   an object having an outer surface;
   a coating disposed on at least a portion of said outer surface of said object; and
   a fluid comprising a foulant in contact with said coating disposed on said at least a portion of said outer surface of said object;
   wherein said coating has an index of refraction within 10% of an index of refraction of said fluid in some portion of the complete optical spectrum and wherein said coating reduces adhesion of the foulant to said outer surface of said object compared to an amount of adhesion of the foulant to said surface of said object without said coating.

13. The object of claim 12, wherein said coating reduces an initial deposition of a monolayer of particles of the foulant on said coating.

14. The object of claim 12, wherein the index of refraction of said coating is within 5% of the index of refraction of said fluid.

15. The object of claim 12, wherein the portion of the complete optical spectrum comprises 400-800 nm in a visible spectrum.

16. The object of claim 12, wherein the portion of the complete optical spectrum comprises 10-400 nm in a UV spectrum.

17. The object of claim 12, wherein said coating comprises a chemical selected from the group consisting of calcite, microcline or albite, olivine, pyrite, fluorite, cryolite, and muscovite.

18. The object of claim 12, wherein the index of refraction of said fluid has a range of 1.00 to 1.76 and the index of refraction of said surface has a range of 1.00 to 1.76.

19. The coating of claim 12, wherein said object comprises an object used in a geothermal power plant.

* * * * *